(12) United States Patent
Peirsman et al.

(10) Patent No.: US 11,208,314 B2
(45) Date of Patent: Dec. 28, 2021

(54) PRESSURIZED BEVERAGE CONCENTRATES AND APPLIANCES AND METHODS FOR PRODUCING BEVERAGES THEREFROM

(71) Applicant: Anheuser-Busch InBev S.A., Brussels (BE)

(72) Inventors: Daniel Peirsman, Bornem (BE); Stijn Vandekerckhove, Sterrebeek (BE); Jerome Pellaud, New Rochelle, NY (US); Nathaniel Davis, New Rochelle, NY (US)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 364 days.

(21) Appl. No.: 15/886,600

(22) Filed: Feb. 1, 2018

(65) Prior Publication Data

US 2018/0155663 A1 Jun. 7, 2018

Related U.S. Application Data

(62) Division of application No. 15/009,937, filed on Jan. 29, 2016.

(Continued)

(51) Int. Cl.
*B67D 1/00* (2006.01)
*B01F 3/04* (2006.01)
(Continued)

(52) U.S. Cl.
CPC ........ *B67D 1/0078* (2013.01); *B01F 3/04787* (2013.01); *B01F 3/04836* (2013.01);
(Continued)

(58) Field of Classification Search
CPC ............ B01F 2215/007; B01F 3/04787; B01F 3/04836; B01F 5/0413; B67D 1/0021;
(Continued)

(56) References Cited

U.S. PATENT DOCUMENTS 3,687,684 A 8/1972 Wentworth et al.
3,991,219 A 11/1976 Kuckens
(Continued)

FOREIGN PATENT DOCUMENTS

CN 202843355 U 4/2013
CN 202891619 U 4/2013
(Continued)

OTHER PUBLICATIONS

EP 1764148A1_translate.pdf (Year: 2007).*
(Continued)

*Primary Examiner* — Dana Ross
*Assistant Examiner* — Ket D Dang
(74) *Attorney, Agent, or Firm* — Michael Best & Friedrich LLP

(57) ABSTRACT

The present invention describes methods and devices in which concentrated beverage products, each packaged in a pressurized container, can be combined with liquids and/or other ingredients to produce one or more servings of a beverage. These products provide users with a convenient way to prepare both alcoholic and non-alcoholic beverages (including carbonated beverages) in various serving sizes and quantities by combining the pressurized beverage concentrate with (possibly carbonated) liquids and other ingredients.

16 Claims, 2 Drawing Sheets

Related U.S. Application Data

(60) Provisional application No. 62/110,348, filed on Jan. 30, 2015.

(51) Int. Cl.
  *B01F 5/04* (2006.01)
  *C12C 5/02* (2006.01)
  *C12C 11/11* (2019.01)
  *B67D 1/08* (2006.01)

(52) U.S. Cl.
  CPC .......... *B01F 5/0413* (2013.01); *B67D 1/0021* (2013.01); *B67D 1/0043* (2013.01); *B67D 1/0045* (2013.01); *B67D 1/0046* (2013.01); *B67D 1/0801* (2013.01); *C12C 5/026* (2013.01); *C12C 11/11* (2013.01); *B01F 2215/007* (2013.01); *B67D 2001/0091* (2013.01); *B67D 2001/0092* (2013.01); *B67D 2001/0822* (2013.01); *B67D 2210/0012* (2013.01)

(58) Field of Classification Search
  CPC .. B67D 1/0043; B67D 1/0045; B67D 1/0046; B67D 1/0078; B67D 1/0801; B67D 2001/0091; B67D 2001/0092; B67D 2001/0822; B67D 2210/0012; C12C 11/11; C12C 5/026
  USPC ........... 99/279; 222/129.1, 129.2, 80–83, 90, 222/144.5, 146.6, 394, 399, 400.7, 400.8, 222/148, 145.5, 145.6, 1, 133, 134, 129.3, 222/135, 12, 9.4, 52, 56, 59, 64, 504
  See application file for complete search history.

(56) References Cited

U.S. PATENT DOCUMENTS

| | | |
|---|---|---|
| 4,014,319 A | 3/1977 | Favre |
| 4,121,507 A | 10/1978 | Kuckens |
| 4,145,466 A | 3/1979 | Leslie et al. |
| 4,298,352 A | 11/1981 | Blysing |
| 4,315,523 A | 2/1982 | Mahawili et al. |
| 4,356,937 A | 11/1982 | Simon et al. |
| 4,363,424 A | 12/1982 | Holben et al. |
| 4,408,701 A | 10/1983 | Jeans |
| 4,520,950 A | 6/1985 | Jeans |
| 4,523,697 A | 6/1985 | Jeans |
| 4,613,325 A | 9/1986 | Abrams |
| 4,659,335 A | 4/1987 | Wegner et al. |
| 4,679,707 A | 7/1987 | Sedam |
| 4,688,701 A | 8/1987 | Sedam |
| 4,702,966 A | 10/1987 | Farrell et al. |
| 4,726,494 A * | 2/1988 | Scott .................. B67D 1/0079 222/129.3 |
| 4,728,005 A | 3/1988 | Jacobs et al. |
| 4,921,135 A | 5/1990 | Pleet |
| 4,928,854 A | 5/1990 | McCann et al. |
| 4,941,353 A | 7/1990 | Fukatsu et al. |
| 4,967,932 A | 11/1990 | Wiley et al. |
| 4,979,639 A | 12/1990 | Hoover et al. |
| 5,058,630 A | 10/1991 | Wiley et al. |
| 5,106,886 A | 4/1992 | Hofeldt et al. |
| 5,121,855 A | 6/1992 | Credle, Jr. |
| 5,141,130 A | 8/1992 | Wiley et al. |
| 5,181,631 A | 1/1993 | Credle, Jr. |
| 5,192,000 A | 3/1993 | Wandrick et al. |
| 5,312,233 A | 5/1994 | Tanny et al. |
| 5,332,123 A | 7/1994 | Farber et al. |
| 5,350,082 A | 9/1994 | Kiriakides, Jr. et al. |
| 5,404,794 A | 4/1995 | Patel et al. |
| 5,415,326 A | 5/1995 | Durham et al. |
| 5,437,842 A | 8/1995 | Jensen et al. |
| 5,490,447 A | 2/1996 | Giuliano |
| 5,499,741 A | 3/1996 | Scott et al. |
| 5,542,265 A | 8/1996 | Rutland |
| 5,641,892 A | 6/1997 | Larkins et al. |
| 5,657,683 A | 8/1997 | Sandei et al. |
| 5,755,683 A | 5/1998 | Houle et al. |
| 5,757,667 A | 5/1998 | Shannon et al. |
| 5,769,271 A | 6/1998 | Miller |
| 5,772,637 A | 6/1998 | Heinzmann et al. |
| 5,797,519 A | 8/1998 | Schroeder et al. |
| 5,813,246 A | 9/1998 | Oh |
| 5,875,703 A | 3/1999 | Rolfes |
| 5,875,930 A | 3/1999 | Nakajima et al. |
| 5,884,813 A | 3/1999 | Bordonaro et al. |
| 5,913,344 A | 6/1999 | Wronski et al. |
| 5,956,967 A | 9/1999 | Kim |
| 5,967,367 A | 10/1999 | Orsborn |
| 5,992,685 A | 11/1999 | Credle, Jr. |
| 6,039,219 A | 3/2000 | Bach et al. |
| 6,059,145 A | 5/2000 | Stratton et al. |
| 6,070,761 A | 6/2000 | Bloom et al. |
| 6,095,031 A | 8/2000 | Warne |
| 6,165,154 A | 12/2000 | Gray et al. |
| 6,170,707 B1 | 1/2001 | Wolski et al. |
| 6,209,344 B1 | 4/2001 | Mahajan |
| 6,209,855 B1 | 4/2001 | Glassford |
| 6,210,361 B1 | 4/2001 | Kamen et al. |
| 6,210,601 B1 | 4/2001 | Hottle et al. |
| 6,227,101 B1 | 5/2001 | Rabadi et al. |
| 6,228,284 B1 | 5/2001 | Ebner et al. |
| 6,312,589 B1 | 11/2001 | Jarocki et al. |
| 6,319,575 B1 | 11/2001 | Takashima et al. |
| 6,321,587 B1 | 11/2001 | Laush |
| 6,337,015 B1 | 1/2002 | Poirier |
| 6,339,985 B1 | 1/2002 | Whitney |
| 6,344,489 B1 | 2/2002 | Spears |
| 6,364,857 B1 | 4/2002 | Gray et al. |
| 6,393,338 B1 | 5/2002 | Kemnitz |
| 6,451,211 B1 | 9/2002 | Plester et al. |
| 6,550,642 B2 | 4/2003 | Newman et al. |
| 6,564,971 B2 | 5/2003 | Heyes |
| 6,600,882 B1 | 7/2003 | Applegate et al. |
| 6,613,280 B2 | 9/2003 | Myrick et al. |
| 6,640,650 B2 | 11/2003 | Matsuzawa et al. |
| 6,648,240 B2 | 11/2003 | Simmons |
| 6,669,051 B1 | 12/2003 | Phallen et al. |
| 6,669,053 B1 | 12/2003 | Garson et al. |
| 6,709,417 B1 | 3/2004 | Houle et al. |
| 6,729,226 B2 | 5/2004 | Mangiapane |
| 6,745,592 B1 | 6/2004 | Edrington et al. |
| 6,751,525 B1 | 6/2004 | Crisp, III |
| 6,756,069 B2 | 6/2004 | Scoville et al. |
| 6,761,036 B2 | 7/2004 | Teague et al. |
| 6,792,847 B2 | 9/2004 | Tobin et al. |
| 6,799,085 B1 | 9/2004 | Crisp, III |
| 6,807,460 B2 | 10/2004 | Black et al. |
| 6,827,113 B2 | 12/2004 | Downs et al. |
| 6,845,886 B2 | 1/2005 | Henry et al. |
| 6,871,761 B2 | 3/2005 | Fox |
| 6,896,159 B2 | 5/2005 | Crisp, III et al. |
| 7,070,068 B2 | 7/2006 | Fox |
| 7,285,300 B1 | 10/2007 | Allington et al. |
| 7,455,867 B1 | 11/2008 | Gutwein et al. |
| 7,607,385 B2 | 10/2009 | Halliday et al. |
| 7,617,850 B1 | 11/2009 | Dorney |
| 7,740,152 B2 | 6/2010 | Hughes et al. |
| 7,754,025 B1 | 7/2010 | Crisp, III |
| 7,855,351 B2 | 12/2010 | Policappelli |
| 7,861,644 B2 | 1/2011 | Ghassemlou et al. |
| 7,997,448 B1 | 8/2011 | Leyva |
| 8,025,184 B2 | 9/2011 | Minard et al. |
| 8,047,126 B2 | 11/2011 | Doglioni Majer |
| 8,087,303 B2 | 1/2012 | Beavis |
| 8,115,494 B2 | 2/2012 | Franklin |
| 8,116,993 B2 | 2/2012 | Cebulski |
| 8,181,825 B2 | 5/2012 | Reddy et al. |
| 8,190,290 B2 | 5/2012 | Crisp, III |
| 8,220,382 B2 | 7/2012 | Verbeek |
| 8,245,739 B1 | 8/2012 | Wade et al. |
| 8,297,458 B2 | 10/2012 | Sumimiya et al. |
| 8,371,211 B2 | 2/2013 | Nosier et al. |

(56) References Cited

U.S. PATENT DOCUMENTS

| | | |
|---|---|---|
| 8,387,516 B1 | 3/2013 | Reynolds |
| 8,424,719 B2 | 4/2013 | Minard et al. |
| 8,528,786 B2 | 9/2013 | Gates |
| 8,626,327 B2 | 1/2014 | Bippert et al. |
| 8,739,689 B2 | 6/2014 | Bombeck et al. |
| 8,746,506 B2 | 6/2014 | Jersey et al. |
| 8,757,549 B2 | 6/2014 | Erben et al. |
| 8,763,654 B2 | 7/2014 | Gras et al. |
| 8,889,201 B2 | 11/2014 | Tatera |
| 8,905,267 B2 | 12/2014 | Minard et al. |
| 8,973,435 B2 | 3/2015 | Preston et al. |
| 8,977,389 B2 | 3/2015 | Witchell et al. |
| 8,985,396 B2 | 3/2015 | Jersey |
| 8,998,035 B2 | 4/2015 | Ford |
| 9,144,640 B2 | 9/2015 | Pudil et al. |
| 9,154,547 B2 | 10/2015 | Kuempel et al. |
| 9,167,935 B2 | 10/2015 | Scholvinck et al. |
| 9,233,824 B2 | 1/2016 | Kirschner et al. |
| 9,266,668 B2 | 2/2016 | Rasmussen et al. |
| 9,388,033 B2 | 7/2016 | Gates |
| 9,527,683 B2 | 12/2016 | Drebinger |
| 9,556,011 B2 | 1/2017 | Van Dillen et al. |
| 9,630,826 B2 | 4/2017 | Green et al. |
| 9,631,611 B2 | 4/2017 | Magoon et al. |
| 9,636,455 B2 | 5/2017 | Kamen et al. |
| 2002/0060226 A1 | 5/2002 | Kameyama |
| 2002/0152895 A1 | 10/2002 | Duffy et al. |
| 2003/0085237 A1 | 5/2003 | Kateman et al. |
| 2004/0197444 A1 | 10/2004 | Halliday et al. |
| 2004/0234713 A1 | 11/2004 | Celerier et al. |
| 2005/0103799 A1 | 5/2005 | Litterst et al. |
| 2005/0105395 A1 | 5/2005 | Harrison |
| 2005/0112249 A1 | 5/2005 | Herrick et al. |
| 2005/0126401 A1 | 6/2005 | Streeter et al. |
| 2005/0133420 A1 | 6/2005 | Rinker et al. |
| 2005/0166765 A1 | 8/2005 | Lyall |
| 2005/0194399 A1 | 9/2005 | Proctor |
| 2005/0268985 A1 | 12/2005 | Litto |
| 2005/0284885 A1 | 12/2005 | Kadyk et al. |
| 2006/0102875 A1 | 5/2006 | Ekkert |
| 2006/0113323 A1* | 6/2006 | Jones ............... B67D 1/0021 222/129.1 |
| 2007/0131711 A1 | 6/2007 | Minard et al. |
| 2007/0181004 A1 | 8/2007 | Hale |
| 2007/0186780 A1 | 8/2007 | Clark |
| 2007/0205220 A1* | 9/2007 | Rudick ............. B67D 1/0025 222/129.4 |
| 2007/0215239 A1 | 9/2007 | Dorney |
| 2008/0008609 A1 | 1/2008 | Pate et al. |
| 2008/0054837 A1 | 3/2008 | Beavis et al. |
| 2008/0073610 A1 | 3/2008 | Manning et al. |
| 2008/0083780 A1* | 4/2008 | Romanyszyn ...... B67D 1/0025 222/129.1 |
| 2008/0105685 A1 | 5/2008 | Parrinello |
| 2008/0148959 A1 | 6/2008 | Bockbrader |
| 2008/0204347 A1 | 8/2008 | Alvey et al. |
| 2008/0229845 A1 | 9/2008 | Minard et al. |
| 2008/0255280 A1 | 10/2008 | Sims et al. |
| 2008/0282897 A1 | 11/2008 | Webster et al. |
| 2008/0283532 A1 | 11/2008 | Koch |
| 2009/0159612 A1 | 6/2009 | Beavis et al. |
| 2009/0317532 A1 | 12/2009 | Bromley |
| 2010/0005903 A1 | 1/2010 | Beavis |
| 2010/0018606 A1 | 1/2010 | Yacou |
| 2010/0203206 A1 | 8/2010 | Hayata et al. |
| 2010/0243596 A1 | 9/2010 | Van Hove et al. |
| 2011/0023726 A1 | 2/2011 | Nesbitt |
| 2011/0121032 A1 | 5/2011 | Deo et al. |
| 2011/0123688 A1 | 5/2011 | Deo et al. |
| 2011/0125334 A1 | 5/2011 | Deo et al. |
| 2011/0151068 A1 | 6/2011 | Taylor |
| 2011/0192495 A1 | 8/2011 | Deo et al. |
| 2011/0200726 A1 | 8/2011 | Tinkler et al. |
| 2011/0215114 A1 | 9/2011 | Liccioni |
| 2011/0226343 A1 | 9/2011 | Novak et al. |
| 2011/0296664 A1 | 12/2011 | Minard et al. |
| 2012/0030688 A1 | 2/2012 | Zimmermann |
| 2012/0090474 A1 | 4/2012 | Carbonini et al. |
| 2012/0102999 A1 | 5/2012 | Anselmino et al. |
| 2012/0103198 A1 | 5/2012 | Koslow et al. |
| 2012/0107453 A1 | 5/2012 | Chase |
| 2012/0156344 A1 | 6/2012 | Studor et al. |
| 2012/0173357 A1 | 7/2012 | Yoakim |
| 2012/0177784 A1 | 7/2012 | Malagi et al. |
| 2012/0308688 A1 | 12/2012 | Peterson et al. |
| 2013/0032036 A1 | 2/2013 | Zhong et al. |
| 2013/0041087 A1 | 2/2013 | Coulter et al. |
| 2013/0087052 A1 | 4/2013 | Castelli et al. |
| 2013/0129870 A1* | 5/2013 | Novak .................. B65D 85/73 426/115 |
| 2013/0171320 A1 | 7/2013 | Scholvinck et al. |
| 2013/0233180 A1 | 9/2013 | Belmont |
| 2013/0233878 A1* | 9/2013 | Lindmayer ......... B67D 1/1202 222/1 |
| 2013/0233887 A1 | 9/2013 | Ford |
| 2013/0285277 A1 | 10/2013 | Behrendt et al. |
| 2013/0330453 A1 | 12/2013 | Doglioni Majer |
| 2014/0047985 A1 | 2/2014 | Chen et al. |
| 2014/0048144 A1 | 2/2014 | Jaeger et al. |
| 2014/0070432 A1 | 3/2014 | Tatera |
| 2014/0079854 A1 | 3/2014 | Vastardis et al. |
| 2014/0113045 A1 | 4/2014 | Njaastad et al. |
| 2014/0147558 A1 | 5/2014 | Rasmussen et al. |
| 2014/0150665 A1 | 6/2014 | Pearson et al. |
| 2014/0150669 A1 | 6/2014 | Green et al. |
| 2014/0150670 A1 | 6/2014 | Green et al. |
| 2014/0154380 A1* | 6/2014 | Brown ..................... A23L 2/54 426/312 |
| 2014/0242224 A1 | 8/2014 | Glucksman et al. |
| 2014/0260999 A1 | 9/2014 | Cardonick et al. |
| 2014/0271593 A1 | 9/2014 | Bromley |
| 2014/0272019 A1 | 9/2014 | Schuh et al. |
| 2014/0335226 A1 | 11/2014 | Bell |
| 2014/0370181 A1 | 12/2014 | Young et al. |
| 2015/0021356 A1 | 1/2015 | Witchell et al. |
| 2015/0064321 A1 | 3/2015 | Story et al. |
| 2015/0118366 A1 | 4/2015 | Bonnel et al. |
| 2015/0157168 A1 | 6/2015 | Burrows |
| 2015/0168188 A1 | 6/2015 | Reichart et al. |
| 2015/0201796 A1 | 7/2015 | Kuempel et al. |
| 2016/0176166 A1 | 6/2016 | Matsui et al. |
| 2016/0222331 A1 | 8/2016 | Peirsman et al. |
| 2018/0155662 A1 | 6/2018 | Peirsman et al. |

FOREIGN PATENT DOCUMENTS

| | | | |
|---|---|---|---|
| CN | 203468329 U | 3/2014 | |
| CN | 203468330 U | 3/2014 | |
| DE | 102006014814 A1 | 10/2007 | |
| DE | 102006048456 A1 | 4/2008 | |
| DE | 102006048457 A1 | 4/2008 | |
| DE | 202007007045 U1 | 9/2008 | |
| DE | 102007048570 A1 | 4/2009 | |
| DE | 102008012486 A1 | 9/2009 | |
| DE | 102010012175 A1 | 9/2011 | |
| EP | 0180442 A2 | 5/1986 | |
| EP | 1510160 A1 | 3/2005 | |
| EP | 1586534 A1 | 10/2005 | |
| EP | 1681969 A1 | 7/2006 | |
| EP | 1731479 A1 | 12/2006 | |
| EP | 1764148 A1 * | 3/2007 | ............ B01F 3/2014 |
| EP | 1934100 A2 | 6/2008 | |
| EP | 2148826 A1 | 2/2010 | |
| EP | 2237707 A1 | 10/2010 | |
| EP | 2262703 A1 | 12/2010 | |
| EP | 2292321 A1 | 3/2011 | |
| EP | 2292551 A1 | 3/2011 | |
| EP | 2293708 A1 | 3/2011 | |
| EP | 2470452 A2 | 7/2012 | |
| EP | 2498651 A1 | 9/2012 | |
| EP | 2499060 A1 | 9/2012 | |
| EP | 2512305 A1 | 10/2012 | |
| EP | 2531080 A2 | 12/2012 | |
| EP | 2572609 A1 | 3/2013 | |

(56) References Cited

FOREIGN PATENT DOCUMENTS

| | | |
|---|---|---|
| EP | 2593398 A1 | 5/2013 |
| EP | 2611713 A1 | 7/2013 |
| EP | 2686091 A1 | 1/2014 |
| EP | 2686092 A1 | 1/2014 |
| EP | 2720587 A1 | 4/2014 |
| EP | 2720961 A1 | 4/2014 |
| GB | 2252513 A | 8/1992 |
| JP | 2003159002 A | 6/2003 |
| JP | 2003192847 A | 7/2003 |
| WO | WO-9505437 A1 | 2/1995 |
| WO | WO-9902419 A1 | 1/1999 |
| WO | WO-200040472 A1 | 7/2000 |
| WO | WO-02057063 A1 | 7/2002 |
| WO | WO-02096645 A1 | 12/2002 |
| WO | WO-2004101666 A2 | 11/2004 |
| WO | WO-2005046409 A1 | 5/2005 |
| WO | WO-2006005401 A2 | 1/2006 |
| WO | WO-2007025773 A2 | 3/2007 |
| WO | WO-2007071224 A1 | 6/2007 |
| WO | WO-2007105944 A2 | 9/2007 |
| WO | WO-2007112892 A2 | 10/2007 |
| WO | WO-2008056057 A1 | 5/2008 |
| WO | WO-2008058344 A1 | 5/2008 |
| WO | WO-2008138400 A1 | 11/2008 |
| WO | WO-200947000 A1 | 4/2009 |
| WO | WO-2009043124 A1 | 4/2009 |
| WO | WO-2009047000 A1 | 4/2009 |
| WO | WO-2009082198 A1 | 7/2009 |
| WO | WO-2009114119 A1 | 9/2009 |
| WO | WO-2010102665 A1 | 9/2010 |
| WO | WO-2011031294 A2 | 3/2011 |
| WO | WO-2011054402 A1 | 5/2011 |
| WO | WO-2011059313 A1 | 5/2011 |
| WO | WO-2011069520 A1 | 6/2011 |
| WO | WO-2011075638 A1 | 6/2011 |
| WO | WO-2011094677 A2 | 8/2011 |
| WO | WO-2012008825 A1 | 1/2012 |
| WO | WO-2012031106 A1 | 3/2012 |
| WO | WO-2012123390 A1 | 9/2012 |
| WO | WO-2012174326 A1 | 12/2012 |
| WO | WO-2012174331 A1 | 12/2012 |
| WO | WO-2013010702 A1 | 1/2013 |
| WO | WO-2013019963 A2 | 2/2013 |
| WO | WO-2013050185 A1 | 4/2013 |
| WO | WO-2013119493 A1 | 8/2013 |
| WO | WO-2013119495 A1 | 8/2013 |
| WO | WO-2013119497 A1 | 8/2013 |
| WO | WO-2013119534 A1 | 8/2013 |
| WO | WO-2013119538 A1 | 8/2013 |
| WO | WO-2013119543 A1 | 8/2013 |
| WO | WO-2013164779 A1 | 11/2013 |
| WO | WO-2013169678 A2 | 11/2013 |
| WO | WO-2014037456 A1 | 3/2014 |
| WO | WO-2015040232 A1 | 3/2015 |

OTHER PUBLICATIONS

Brewmastersselect, "High Gravity Beers" (2014) (available at https://web.archive.org/web/20140718092124/https://brewmastersselect.wordpress.com/high-gravity-beers).

Goulet, "Can You Really Make Drinkable Beer From Concentrate?" Popular Mechanics (Jan. 7, 2015) (available at www.popularmechanics.com/technology/gadgets/a29/pats-backcountry-beverages-beer-from-concentrate-17608940).

Orchant, Huffington Post, Why Cheerwine is 'Nectar of North Carolina' <https://www.huffingtonpost.com/2012/12/13/cheerwine-north-carolina-soda_n_2293059.html> (Year: 2012).

International Search Report dated May 9, 2016, issued in PCT/IB2016/050455.

International Preliminary Report on Patentability dated Aug. 1, 2017, issued in PCT/IB2016/050455.

Written Opinion of the International Searching Authority dated May 9, 2016, issued in PCT/IB2016/050455.

International Search Report dated May 27, 2016, issued in PCT/IB2016/051054.

International Preliminary Report on Patentability dated Aug. 29, 2017, issued in PCT/IB2016/051054.

Written Opinion of the International Searching Authority dated May 27, 2016, issued in PCT/IB2016/051054.

International Search Report dated Jul. 29, 2016, issued in PCT/IB2016/053080.

International Preliminary Report on Patentability dated Nov. 28, 2017, issued in PCT/IB2016/053080.

Written Opinion of the International Searching Authority dated Jul. 29, 2016, issued in PCT/IB2016/053080.

Office Action which issued for U.S. Appl. No. 15/009,937 dated Feb. 21, 2018.

Office Action which issued for U.S. Appl. No. 15/009,937 dated Nov. 27, 2018.

Office Action which issued for U.S. Appl. No. 15/009,937 dated Apr. 2, 2020.

Office Action which issued for U.S. Appl. No. 15/009,937 dated Nov. 23, 2020.

Office Action which issued for U.S. Appl. No. 15/886,575 dated Jun. 28, 2018.

Office Action which issued for U.S. Appl. No. 15/886,575 dated Mar. 5, 2019.

Office Action which issued for U.S. Appl. No. 15/886,575 dated Apr. 29, 2020.

Office Action which issued for U.S. Appl. No. 15/886,575 dated Nov. 17, 2020.

Klara, 5 Totally Drinkable High-Proof Liquors That Will Make You Look Cool, Adweek, <https://www.adweek.com/3rand-marketing/5-totally-drinkable-high-proof-liquors-will-make-you-look-cool-158514/> (Year: 2014).

United States Patent Office Action for U.S. Appl. No. 15/009,937 dated Jun. 15, 2021 (10 pages).

United States Patent Office Action for U.S. Appl. No. 15/886,575 dated Jun. 15, 2021 (9 pages).

University of Utah, Carbon Dioxide and Carbonic Acid, accessed Nov. 26, 2018; relied on as evidentiary reference <http://on.chem.usu.edu/-sbial kow/Classes/3650/Carbonate/Carbonic%20Acid.html> (Year: 2018).

Nestfall, Autumn Inspired Craft Beer Cocktails, Craftabrew, Accessed: Jun. 12, 2021 <https://craftabrew.com/blogs/iews/15470605-autumn-inspired-craft-beer-cocktails> (Year: 2014).

* cited by examiner

PRESSURIZED BEVERAGE CONCENTRATES AND APPLIANCES AND METHODS FOR PRODUCING BEVERAGES THEREFROM

CROSS-REFERENCE TO RELATED APPLICATION

This application is a divisional and claims the benefit under 35 U.S.C. § 120 of U.S. patent application Ser. No. 15/009,937, filed Jan. 29, 2016, which claims the benefit under 35 U.S.C. § 119(e) of U.S. Provisional Patent Application No. 62/110,348, filed Jan. 30, 2015, each of which is herein incorporated by reference in its entirety.

TECHNICAL FIELD

The present invention pertains to devices and methods for delivering pressurized, concentrated beverages, as well as appliances and methods for producing one or more beverages from such pressurized beverage concentrates. More particularly, the present invention is directed to: a) devices for delivering a concentrated beverage that comprise a concentrated beverage contained within a container along with pressurized gas, and methods for manufacturing such devices; and b) methods and appliances for producing beverages from a pressurized beverage concentrate by unsealing a container in which the pressurized beverage concentrate is stored and diluting the concentrate with a liquid.

BACKGROUND OF THE INVENTION

In recent years, a diverse array of devices for preparing and dispensing beverages have been developed and marketed. Some of these methods and devices allow users to prepare beverages, such as coffee or tea, in single-serving quantities on demand. These devices vary wildly in their complexity, size, and expense, and can be purchased for use at home or in the office.

Many of these devices allow users to prepare hot, brewed beverages such as coffee or tea. Commonly, these devices function by heating water to near-boiling temperatures, and then passing that heated water over coffee powder or tea leaves. In certain devices, the coffee powder or tea leaves are contained in pre-packaged containers designed specifically for use in that device. After the coffee or tea is brewed and the beverage dispensed from the machine, a user of the device can add ingredients such as milk, cream, sugar, or honey to the beverage.

However, these existing devices suffer from many drawbacks. They are commonly limited to specific types of hot beverages, such as coffee or tea, as described above. And recently, the beverage world has seen a proliferation of extremely popular specialized beverages—such as microbrewed beers that expertly blend a complex array of flavors and ingredients, spirits infused with fruits and spices, and sports drinks that offer both taste and nutrition, and zero-calorie soft drinks that meld new ingredients with traditional flavors. The pre-packaged containers described above simply cannot (for example) be used to provide carbonated drinks, such as beer, and are incapable of meeting consumers' needs and desires for these varied beverages.

Therefore, there remains a need for products that allow consumers to quickly and easily prepare a variety of beverages from pre-packaged ingredients—a need met by the methods and devices of the present invention. For example, the pressurized, concentrated beverages of the present invention could allow a user to quickly and easily prepare single servings of a number of different craft beers by mixing carbonated or non-carbonated water with the concentrated, pressurized beverages, resulting in a beverage with a complex, delicious mouth-feel that cannot be provided by existing products.

SUMMARY OF THE INVENTION

The present invention is directed, in certain embodiments, to devices for delivering a concentrated beverage, comprising a concentrated beverage, a container containing the concentrated beverage, and a pressurized gas. In certain embodiments of the invention, the container is selected from the group consisting of a pod, a pack, a capsule, a bottle, a cylinder, and a cartridge. In certain further embodiments of the invention, the container comprises a material selected from the group consisting of steel, aluminum, polyethylene terephthalate (PET), high-density polyethylene (HDPE), glass, and ceramics. In further embodiments of the invention, the container can withstand a gas pressure of at least 30 bar above atmospheric pressure, and in still further embodiments of the invention, the container can withstand a gas pressure of at least 40 bar above atmospheric pressure.

In certain embodiments of the invention, the container is reusable. In certain further embodiments of the invention, multiple servings of a beverage can be produced from the concentrated beverage.

In certain embodiments of the invention, the concentrated beverage is selected from the group consisting of a beer (including ales and lagers), a cider, a wine, a spirit, a soft drink, a juice, a coffee, or a tea. In certain further embodiments of the invention, the concentrated beverage is a high-gravity beer having a specific gravity of at least 1.070.

In certain embodiments of the invention, the concentrated beverage has a sugar content of about 40 degrees Brix to about 70 degrees Brix.

In certain embodiments of the invention, the concentrated beverage has an alcohol content of about 2 alcohol by volume (ABV) to about 12 ABV. In certain other embodiments of the invention, the concentrated beverage has an alcohol content of about 10 ABV to about 14 ABV. In still other embodiments of the invention, the concentrated beverage has an alcohol content of about 50 ABV to about 70 ABV.

In certain embodiments of the invention, the pressurized gas is dissolved in the concentrated beverage. In further embodiments of the invention, the pressurized gas is selected from the group consisting of carbon dioxide, nitrogen, nitrous oxide, and nitrogen dioxide. In still further embodiments of the invention, the pressurized gas is carbon dioxide, and the concentrated beverage is hypercarbonated.

In certain embodiments of the invention, the pressurized gas, at 23° C., has a gas pressure from about 5 bar above atmospheric pressure to about 15 bar above atmospheric pressure. In certain further embodiments of the invention, the pressurized gas has a gas pressure of approximately 9.4 bar above atmospheric pressure at 23° C.

In certain other embodiments of the invention, the pressurized gas has a gas pressure of between about 34 bar above atmospheric pressure to above 50 bar above atmospheric pressure at 23° C.

The present invention is directed, in certain embodiments, to methods of producing a beverage from a pressurized beverage concentrate, comprising the steps of unsealing a container in which the pressurized beverage concentrate is stored and diluting the pressurized beverage concentrate with liquid to produce a beverage. In certain embodiments of the invention, the liquid is water. In certain further embodiments of the invention, the water is carbonated water. In still further embodiments of the invention, the water is hypercarbonated water.

In certain embodiments of the invention, the step of diluting the pressurized beverage concentrate comprises diluting the pressurized beverage concentrate with water to produce a beverage having a sugar content of about 1 degrees Brix to about 30 degrees Brix and an alcohol content of about 2 ABV to about 16 ABV.

In certain embodiments of the invention, the method of producing a beverage comprises a step of deionizing the pressured beverage concentrate to remove anions and cations before the pressurized beverage concentrate is diluted with water.

In certain embodiments of the invention, the method of producing a beverage comprises a step of adding a flavor ingredient to the produced beverage. In certain further embodiments of the invention, the flavor ingredient is selected from the group consisting of a spice flavor, a fruit flavor, an herb flavor, a hop flavor, a malt flavor, a nut flavor, a smoke flavor, a coffee flavor, a chocolate flavor, and mixtures thereof.

In certain embodiments of the invention, the method of producing a beverage comprises a step of adding a concentrated ingredient to the produced beverage. In certain further embodiments of the invention, the concentrated ingredient is a solid or liquid ingredient selected from the group made up of hop concentrates, fruit concentrates, sweeteners, bittering additives, concentrated spices, foaming promoters, concentrated malt-based liquids, concentrated fermented liquids, concentrated beer, colorants, alcohols, flavoring additives, and mixtures thereof.

In certain embodiments of the invention, diluting the pressurized beverage concentrate with water to produce a beverage results in multiple servings of a beverage being produced from the pressurized beverage concentrate.

The present invention is directed, in certain embodiments, to appliances for preparing a beverage, appliances that comprise a first receptacle for intake of a container containing a concentrated, pressurized beverage, a first liquid intake for intake of a liquid, a first mixing element for mixing the concentrated, pressurized beverage with the liquid to produce a beverage, and a beverage outlet to dispense a produced beverage.

In certain embodiments, the first mixing element is a static mixer. In certain further embodiments, the static mixer is an in-line mixer. In still further embodiments, the in-line mixer is a venturi. In certain other embodiments, the static mixer is a mixing chamber. In certain further embodiments, the mixing chamber is a disposable mixing chamber composed of a plastic material.

In certain embodiments of the present invention, the appliance comprises a second liquid intake for intake of a carbonated liquid, and a second mixing element for mixing a beverage output from the first mixing chamber with the carbonated liquid. In certain further embodiments of the invention, the carbonated liquid is carbonated water. In still further embodiments of the invention, the carbonated water is hypercarbonated water.

In certain embodiments of the present invention, the second mixing element is a carbonation chamber or a static mixer. In certain further embodiments of the present invention, the second mixing element is a disposable mixing chamber comprised of a plastic material.

In certain embodiments of the present invention, the appliance comprises a second receptacle for intake of an ingredient. In certain further embodiments, the ingredient is a flavor ingredient selected from the group consisting of a spice flavor, a fruit flavor, an herb flavor, a hop flavor, a malt flavor, a nut flavor, a smoke flavor, a coffee flavor, a chocolate flavor, and mixtures thereof. In certain other embodiments, the concentrated ingredient is a solid or liquid ingredient selected from the group consisting of hop concentrates, fruit concentrates, sweeteners, bittering additives, concentrated spices, foaming promoters, concentrated malt-based liquids, concentrated fermented liquids, concentrated beer, alcohols, colorants and mixtures thereof.

DETAILED DESCRIPTION OF THE INVENTION

Figure 1:
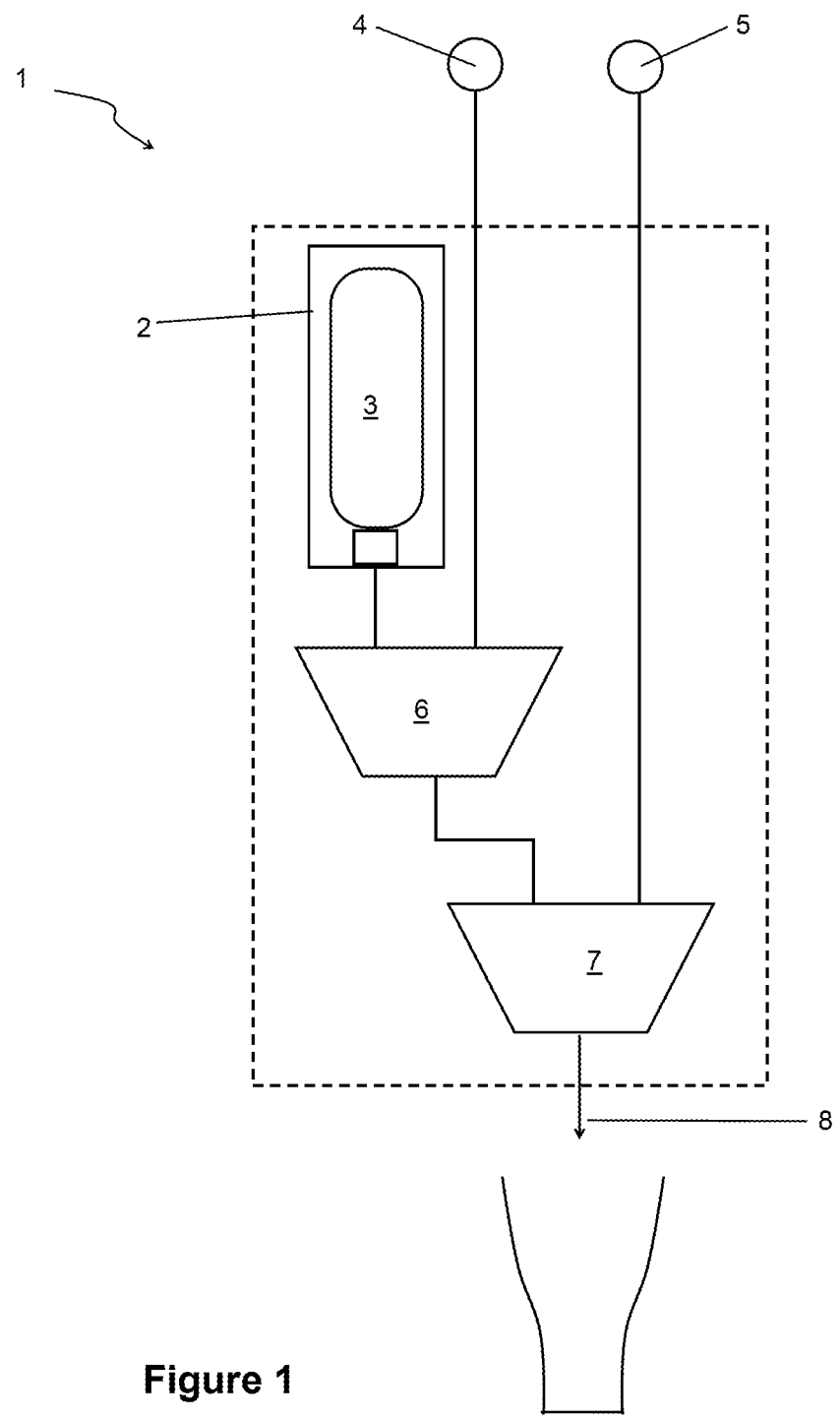
FIG. 1 is an exemplary appliance for preparing a beverage from a pressurized beverage concentrate.

As described above, the present invention is directed to devices and methods for delivering pressurized, concentrated beverages, as well as devices and methods for producing one or more beverages from such pressurized beverage concentrates. Embodiments of the present invention comprise devices for delivering a pressurized beverage concentrate and methods of manufacturing such devices, methods of producing one or more beverages from a pressurized beverage concentrate, as well as devices for producing one or more beverages from a pressurized beverage concentrate.

In preferred embodiments of the invention, a device for delivering a pressurized beverage concentrate comprises three elements: a concentrated beverage, a pressurized gas, and a container in which the concentrated beverage and pressurized gas are sealed. One of skill in the art will recognize that this container can take many different forms: in various embodiments of the present invention, the container can be any one of a pod, a pack, a capsule, a bottle, a cylinder, a cartridge, or equivalents thereof.

Similarly, those of skill in the art will also recognize that the container in which the concentrated beverage and pressurized gas are sealed can be composed of one or more of a variety of different materials. The container may be manufactured from plastics (including, but not limited to polyethylene terephthalate (PET) or high-density polyethylene), metals such as steel, stainless steel, or aluminum, or other materials such as glass, ceramic, composites, or other polymers.

In some embodiments, the container is designed to withstand high levels of pressure from the pressurized gas contained within the container. In certain embodiments, the container is capable of withstanding a gas pressure of at least 20 bar above atmospheric (i.e., ambient) pressure; in further preferred embodiments, of at least 30 bar above atmospheric pressure; in even further preferred embodiments, of at least 40 bar above atmospheric pressure; and in still further preferred embodiments, of at least 50 bar above atmospheric pressure.

Those of ordinary skill will be familiar with suitable container designs for containing gasses at the levels of pressure discussed above. One such design is the nitrous oxide "charger" used for producing whipped cream (also known as a "whip-it")—a recyclable steel cylinder, capped with metal (i.e., steel or aluminum), that contains nitrous oxide at high pressure (for example, crimped closure Article Nos. 0080, 0084, 0085, 0087, 0088, 30601, and 30602). In certain embodiments of the present invention, similar containers may be used to package the concentrated beverage and the pressurized gas.

In certain embodiments of the invention, the container is disposable. For example, the container can be composed of a disposable or recyclable plastic, and can be thrown away or recycled after use. In other embodiments, the container is reusable. In some cases, the container can be cleaned and refilled with additional beverage concentrate and pressurized gas. In other cases, the container can be used to produce more than one serving of a beverage, and can be reused until the supply of concentrated beverage contained therein is exhausted.

In various embodiments of the invention, the ingredient container may have properties intended to preserve the concentrated beverage stored within the container. In some embodiments, the container may comprise oxygen scavengers or oxygen absorbers, such as ferrous carbonate, ascorbate, sodium hydrogen carbonate, and citrus, which reduce the level of oxygen in the package, preventing at least some oxidation reactions from occurring and helping to preserve the concentrated beverage in the container. In some embodiments of the invention, the container may be a gas barrier, an oxygen barrier, and/or a light barrier. For example, the exterior of the container may be coated with an inorganic oxide, which helps prevent gases such as oxygen and carbon dioxide from entering or exiting the container, and a light blocking colorant, to help prevent light (including ultraviolet light) that can cause chemical reactions with the concentrated beverage from entering the container.

Those of skill in the art will recognize that various beverages can be concentrated, pressurized, and packaged in the containers of the present invention. For example, the concentrated beverage of the present invention can be a beer (including ales and lagers), a cider, a wine, a malt-based beverage, a fermented beverage, a cider-based beverage, a spirit, a juice, a syrup, a carbonated or non-carbonated soft drink, a coffee, or a tea.

For the purposes of the present invention, the term "beer" is defined as a beverage produced by the brewing and fermentation of a starch source in water using yeast. Suitable starch sources include, but are not limited to, grains such as barley, wheat, corn, rice, sorghum, and millet. Other starch sources, such as cassava, sugarcane, and potato, can also be used as a starch source to produce a beer. Similarly, various strains of yeast may be used to ferment a "beer," including but not limited to ale yeast strains ("top-fermenting" yeast) and lager yeast strains ("bottom-fermenting" yeast).

For the purposes of the present invention, the term "beer" includes but is not limited to a particular subset of beverages defined as a "beer" under a particular state's laws, regulations, or standards. For example, the German Reinheitsgebot states that a beverage having ingredients other than water, barley-malt, and hops cannot be considered a "beer"—but for the purposes of the present invention, the term "beer" has no such ingredient restrictions. Similarly, for the purposes of the present invention, the term "beer" does not import or imply a restriction on the alcoholic content of a beverage.

In a preferred embodiment, the concentrated beverage is a concentrated beer produced from a high-gravity beer. As those of skill in the art are aware, the "gravity" or "specific gravity" of an alcohol beverage refers to the relative density of the wort (or must, if the beverage is wine) in comparison to water during the fermentation process. The "original gravity" refers to the density of the wort (the sugar-containing liquid extracted from the grain during the mashing process) before yeast is added (or "pitched") to the wort to begin the fermentation process, where the yeast consumes the sugar in the wort, producing carbon dioxide and alcohol.

For the purposes of the present invention, a "high-gravity" beer refers to a beer having an original gravity of at least 1.070. A higher original gravity indicates that the wort from which the beer is brewed contains a relativity high concentration of sugar and flavor-enhancing ingredients. A higher concentration of sugar provides the yeast more food, from which additional alcohol can be produced, and a high-gravity beer therefore tends to have a higher alcohol content than a beer having a lower original gravity. As those of skill in the art will recognize, different strains of yeast have different tolerances for alcohol, and certain strains may be able to survive at higher alcohol levels than others. In these preferred embodiments, the high gravity beer has an alcohol concentration of at least 8 alcohol by volume (ABV), more preferably at least 12 ABV, and most preferably at least 16 ABV.

As those of skill in the art will recognize, the concentrated beverage produced by and for use in various embodiments of the present invention can be produced by a number of different processes, including nanofiltration, ultrafiltration, microfiltration, reverse osmosis, distillation, fractionation, carbon filtration, or frame filtration. The concentration process(es) can be performed with a semi-permeable membrane composed of one or more materials selected from the group consisting of cellulose acetate, polysulfone, polyamide, polypropylene, polylactide, polyethylene terephthalate, zeolites, aluminum, and ceramics.

The processes utilized to produce the concentrated beverage of the present invention can involve one or more concentration steps. In certain embodiments, for example, the beverage may be subjected to a first concentration step (for example, nanofiltration) to obtain a primary beer concentrate (the retentate) and a permeate. The retentate is composed of solids such as carbohydrates, proteins, and divalent and multivalent salts, and the permeate is made up of water, alcohol, and volatile flavor components. The permeate can then be subjected to one or more further concentration steps (for example, distillation or reverse osmosis) to obtain a permeate enriched in alcohol and other volatile flavor components, such as aromas. The retentate from the original step can then be combined with this concentrated permeate to produce a concentrated beer to be packaged in accordance with the methods and devices of the present invention.

In certain embodiments of the invention, the resulting concentrated beverage has a sugar content of between about 30 degrees Brix and about 80 degrees Brix, and in further embodiments, a sugar content of between about 50 degrees Brix and about 70 degrees Brix. In other embodiments of the invention, the concentrated base liquid has a sugar content of between 10 and between 30 degrees Brix. In these embodiments, the concentrated beverage may have an alcohol content of between about 2 ABV to about 12 ABV, between about 10 ABV to about 14 ABV, or between about 50 ABV to about 70 ABV.

In addition to the concentrated beverage itself, the container also contains pressurized gas. In preferred embodiments of the invention, the gas is injected into the container under pressure, and then the container is sealed. As those of skill in the art will recognize, the container can be sealed using a number of known methods, such as the crimping metal seal used to seal the "whip-it" gas chargers described above.

Various types of gases can be used to pressurize the concentrated beverages of the present invention, including but not limited to one or more of carbon dioxide, nitrogen, nitrogen dioxide, and nitrous oxide. In these embodiments, the pressurized gas dissolves into the concentrated beverage. In preferred embodiments of the present invention, the pressurized gas is carbon dioxide, and the dissolution of the carbon dioxide into the concentrated beverage results in a carbonated beverage.

For purposes of the present invention, a "hypercarbonated" beverage is defined as a beverage that contains a greater amount of dissolved carbon dioxide than the level of carbon dioxide typically found in a carbonated beverage. As a result, a hypercarbonated beverage can be diluted by adding one or more liquids (for example, still water), and result in a beverage having an acceptable level of carbonation. Exemplary embodiments of hypercarbonated beverages include a beer (having a typical carbonation level of 2-6 g/L of carbon dioxide when carbonated) carbonated to a level greater than 6 grams of carbon dioxide per liter, or a water or soft drink (having a typical carbonation level of 4-7 g/L when carbonated) carbonated to a level greater than 7 grams of carbon dioxide per liter. In some preferred embodiments of the present invention, the concentrated beverage is hypercarbonated by pressurized carbon dioxide in the container.

Those of ordinary skill in the art will recognize that the pressurized gas can be injected into the concentrated beverage's container at varying levels of pressure. In some embodiments, the gas in the container is pressurized at a level between about 20 bar above atmospheric pressure and about 40 bar above atmospheric pressure. In other embodiments, the pressurized gas, at 23 degrees Celsius, has a gas pressure of between approximately 5 bar above atmospheric pressure and about 15 bar above atmospheric pressure. In one exemplary embodiment, the pressurized gas has a gas pressure of approximately 9.4 bar above atmospheric pressure at 23 degrees Celsius. In another exemplary embodiment, the pressurized gas has a gas pressure of between about 34 bar above atmospheric pressure to above 50 bar above atmospheric pressure at 23 degrees Celsius.

Embodiments of the present invention do not merely encompass the manufacture and production of the concentrated beverage product, but its use as well. In preferred embodiments of the invention, to produce one or more servings of a beverage from the concentrated beverage product, the container is unsealed (by puncturing the metal cap on the container or by other techniques well-known to those skilled in the art), and one or more liquids is added to the concentrated beverage sealed in that container to produce a resulting beverage.

In certain exemplary embodiments of the invention, water is added to the concentrated beverage to produce a beverage suitable for consumption. In some embodiments, the water is carbonated water, and in some exemplary embodiments, the water is hypercarbonated water. In other exemplary embodiments, the beverage produced by mixing the concentrated beverage with water is carbonated or hypercarbonated by dissolving (through sparging or equivalent processes known to those of skill in the art) additional carbon dioxide into the beverage.

In some preferred embodiments, the concentrated beverage is a concentrated high-gravity beer to which water is added, which dilutes the beer and produces a beverage. In these embodiments, the addition of water results in a beer having a sugar content of about 1 degrees Brix to about 30 degrees Brix and an alcohol content of about 2 ABV to about 16 ABV. In an exemplary embodiment, the resulting beer has a sugar content of between 4 and 7 degrees Brix and an alcohol content of between 2 ABV and 8 ABV. In another exemplary embodiment, the resulting beer has a sugar content of about 17 degrees Brix and an alcohol content of between 8 ABV and 12 ABV. In various embodiments, the resulting beer has an alcohol content of between 2-4 ABV, between 4-6 ABV, between 6-8 ABV, between 8-10 ABV, or between 10-12 ABV.

While the above-described embodiments discuss diluting the concentrated beverage with liquid, those of skill in the art will readily recognize that other liquids besides water can be added to the concentrated beverage to produce a beverage, including a beer (including ales and lagers), a cider, a wine, a malt-based beverage, a fermented beverage, a cider-based beverage, a spirit, a juice, a syrup, a carbonated or non-carbonated soft drink, a coffee, or a tea.

In certain embodiments of the present invention, one or more flavor ingredients can be added to the concentrated beverage to produce a final beverage. Examples of suitable flavor ingredients include (but are not limited to) a spice flavor, a fruit flavor, a hop flavor, a malt flavor, a nut flavor, a smoke flavor, other suitable flavors (such as a coffee flavor or a chocolate flavor), and mixtures of such flavors.

Moreover, other concentrated ingredients can be added or combined with the concentrated beverage to produce a final beverage, including but not limited to other concentrated beverages. These concentrated ingredients can be, for example, solid or liquid ingredients such as hop concentrates, fruit concentrates, sweeteners, bittering additives, concentrated spices, foaming promoters, concentrated malt-based liquids, concentrated fermented liquids, concentrated beer, colorants, flavoring additives, and mixtures thereof. In some cases, the concentrated ingredients (for example, concentrated beers) may be alcoholic concentrated ingredients.

In some embodiments of the present invention, the quantity of concentrated beverage packaged in the container is measured so that precisely a single serving of a beverage can be prepared from the concentrated beverage in the container. In other embodiments of the present invention, the concentrated beverage is packaged in a quantity suitable for producing multiple servings of a beverage. In some of these embodiments, the multiple servings of the beverage are produced simultaneously in a single mixing step. In other embodiments, the concentrated beverage can be repeatedly mixed with liquid to prepare successive single servings of the beverage.

In various embodiments of the invention, the serving size of the beverage produced can be 6 ounces, 8 ounces, 10 ounces, 12 ounces, 14 ounces, 16 ounces, 18 ounces, 20 ounces, 22 ounces, or 24 ounces. In certain further embodiments of the invention, half of the serving size of the beverage comprises the concentrated beverage, and half of the serving size of the beverage comprises the liquid with which the concentrated beverage is diluted. In other further embodiments of the invention, one-third of the serving size of the beverage comprises the concentrated beverage, and two-thirds of the serving size of the beverage comprises the liquid with which the concentrated beverage is diluted.

In some embodiments of the invention, the concentrated beverage is deionized to remove anions or cations from the concentrated beverage. This deionization step may occur before (or after) packaging, and/or before or after the concentrated beverage is diluted with one or more liquids to produce a beverage.

In an exemplary embodiment of the present invention, such as that shown in FIG. 1, an appliance 1 for preparing a beverage from a pressurized beverage concentrate is provided. The appliance 1 comprises a receptacle 2 for intake of containers 3 in which the pressurized beverage concentrates are packaged, at least one liquid intake 4 for the intake of water (and equivalent liquids), at least one mixing element 6 in which the pressurized beverage concentrate is mixed with the water (or other liquid) to produce a beverage, and an outlet 8 from which the resulting beverage is dispensed.

In exemplary embodiments of the appliance described above, the mixing element 6 is a static mixer without moving parts that utilizes turbulence to mix liquids and produce a beverage. The static mixer can be composed of various materials, including stainless steel, polypropylene, Teflon, PDVF, PVC, CPVC, and polyacetal, and can be a plate-type static mixer or a helical-type static mixer. In some embodiments of the invention, the mixing element 6 is a disposable plastic mixer chamber which can be disposed of and replaced for sanitary/hygienic reasons.

In certain embodiments of the present invention, the static mixer is an in-line mixer. In some embodiments of the invention, this mixing element 6 is a venturi (a constricted, narrow diameter section of a pipe or line, which causes liquid passing through that section to increase in velocity but decrease in pressure—a phenomenon known as the "venturi effect"). As liquid flows through the venturi, the venturi effect creates a vacuum which causes turbulence, causing mixing of the liquid(s) and other ingredients to occur.

In certain embodiments of the invention, the appliance also comprises a second mixing element 7 into which the beverage passes before it is dispensed from the appliance. In some embodiments of the invention, this second mixing element is a carbonation chamber, where pressurized gas is dissolved into the beverage to carbonate or hypercarbonate the beverage. In other embodiments, this chamber is a second static mixing chamber connected to a second liquid intake 5 for carbonated water (or another carbonated or hypercarbonated liquid) which is mixed with the beverage. Like the first mixing chamber described above, this second mixing chamber can be a disposable plastic component.

Figure 2:
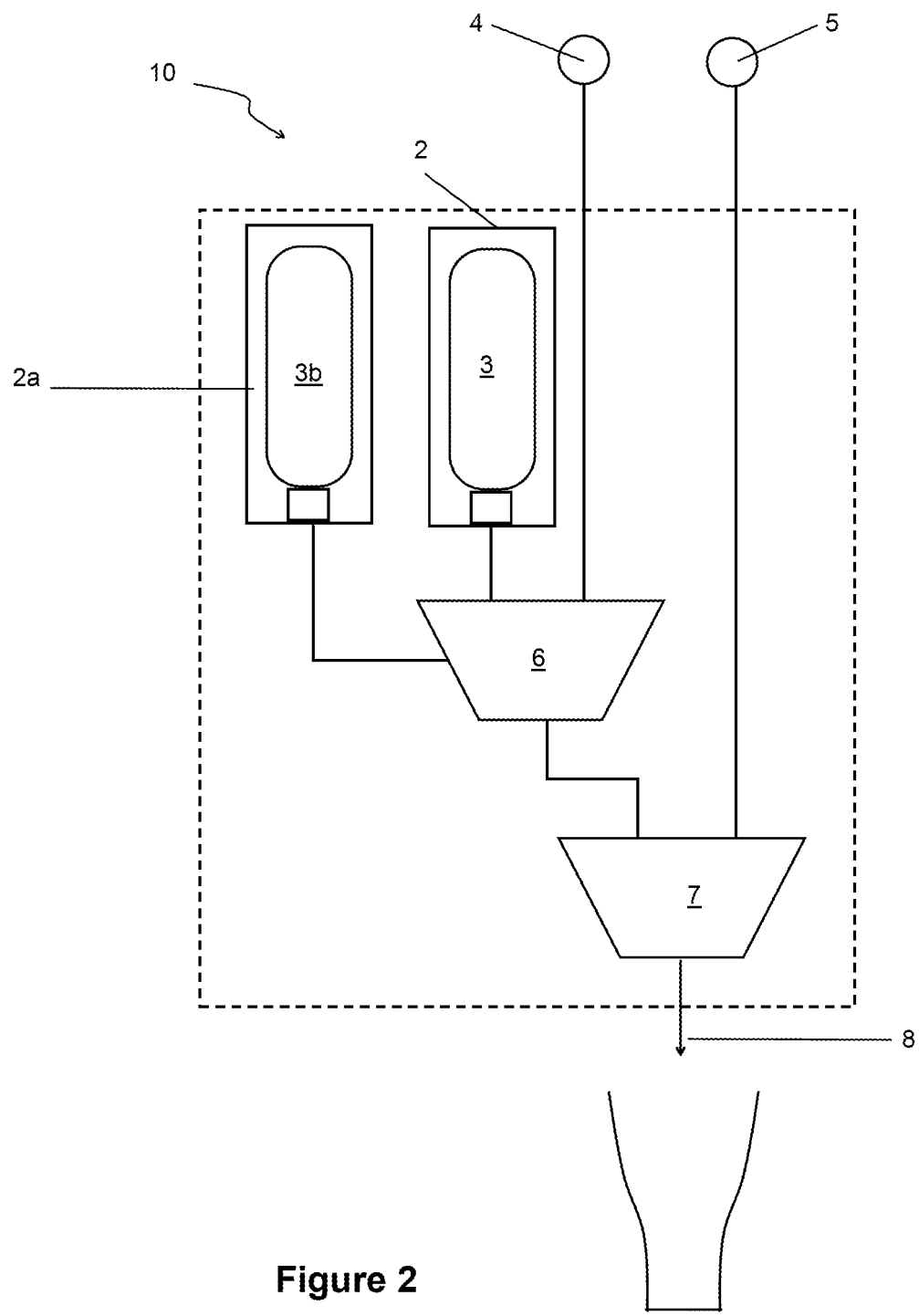
FIG. 2 shows an exemplary appliance for preparing a beverage with receptacles for intake of other ingredients.

In certain embodiments of this appliance for preparing a beverage, as shown in FIG. 2, the appliance 10 comprises additional receptacles 2a for intake of other ingredients 3b. These ingredients can be solid or liquid ingredients, including additional concentrated beverages for mixing with the first concentrated beverage. Various types of suitable flavor ingredients and concentrated ingredients known to those in the art are discussed above.

Examples

The following prophetic examples describe potential embodiments of the present invention:

Example 1: A concentrated, carbonated beer, having three times the sugar and alcohol by volume (ABV) levels of the high-gravity beer from which the concentrated beer is derived, is packaged and sealed in a plastic pod with carbon dioxide pressurized to 9.4 bar above atmospheric pressure at 23° C. The concentrated, pressurized beer is diluted with carbonated water to form a beverage having an alcohol content of about 8-10 ABV.

Example 2: A concentrated beer, having two times the sugar and alcohol by volume (ABV) levels of the beer from which the concentrated beer is derived, is packaged and sealed in a steel cartridge with nitrous oxide pressurized to 20 bar above atmospheric pressure at 23° C. The concentrated, pressurized beer is diluted with hypercarbonated water to form a beverage having an alcohol content of about 4-6 ABV, and the beverage can be dispensed.

Example 3: A concentrated, hypercarbonated beer, having an alcohol content of between 12 and 16 alcohol by volume (ABV), is packaged and sealed in a capsule containing carbon dioxide pressurized to 15 bar above atmospheric pressure at 23° C. The concentrated, hypercarbonated beer is diluted with water to produce multiple servings of a beverage having an alcohol content of between 6-8 ABV, and concentrated flavors are added to the servings of the beverage before it is dispensed.

Example 4: A concentrated, hypercarbonated beer having an alcohol content a sugar content of about 17 degrees Brix and an alcohol content of between 8 ABV and 12 ABV is packaged in a pod containing pressurized carbon dioxide. The concentrated, hypercarbonated beer is diluted with water to produce at least one serving of a beverage having an alcohol content of between 2-8 ABV. At least one flavoring and additional alcohol are added to the at least one serving of the beverage before the beverage is dispensed.

Embodiments and prophetic examples of the present invention have been described for the purpose of illustration. Persons skilled in the art will recognize from this description that the described embodiments and prophetic examples are not limiting, and may be practiced with modifications and alterations limited only by the spirit and scope of the appended claims which are intended to cover such modifications and alterations, so as to afford broad protection to the various embodiments of the invention and their equivalents.

What is claimed is:
1. An appliance, comprising:
a first receptacle for intake of a single container containing a concentrated beverage and a pressurized gas;
a first liquid intake for intake of a liquid;
a first mixing element for mixing the concentrated beverage and the pressurized gas with the liquid to produce a beverage;
a second liquid intake for intake of a carbonated liquid;
a second mixing element for mixing the beverage output from the first mixing element with the carbonated liquid; and
a beverage outlet to dispense the beverage.
2. The appliance of claim 1, wherein the first mixing element is a static mixer.
3. The appliance of claim 2, wherein the static mixer is an in-line mixer.
4. The appliance of claim 3, wherein the in-line mixer is a venturi.
5. The appliance of claim 2, wherein the static mixer is a mixing chamber.
6. The appliance of claim 5, wherein the mixing chamber is a disposable mixing chamber composed of a plastic material.
7. The appliance of claim 1, wherein the carbonated liquid is carbonated water.
8. The appliance of claim 7, wherein the carbonated water is hypercarbonated water.
9. The appliance of claim 7, wherein the second mixing element is a disposable mixing chamber composed of a plastic material.

10. The appliance of claim 1, wherein the second mixing element comprises one of a carbonation chamber and a static mixer.

11. The appliance of claim 1, further comprising a second receptacle for intake of an ingredient.

12. The appliance of claim 11, wherein the ingredient is a flavor ingredient selected from the group consisting of a spice flavor, a fruit flavor, an herb flavor, a hop flavor, a malt flavor, a nut flavor, a smoke flavor, a coffee flavor, a chocolate flavor, and mixtures thereof.

13. The appliance of claim 11, wherein the ingredient is a solid or liquid concentrated ingredient selected from the group consisting of hop concentrates, fruit concentrates, sweeteners, bittering additives, concentrated spices, foaming promoters, concentrated malt-based liquids, concentrated fermented liquids, concentrated beer, alcohols, flavor additives, colorants and mixtures thereof.

14. The appliance of claim 1, wherein the pressurized gas is pressurized to approximately 9.4 bar above atmospheric.

15. The appliance of claim 1, wherein the pressurized gas is pressurized to approximately 20 bar above atmospheric.

16. The appliance of claim 1, wherein the pressurized gas is pressurized to approximately 15 bar above atmospheric.

* * * * *